United States Patent
Gill et al.

(10) Patent No.: US 12,086,000 B1
(45) Date of Patent: Sep. 10, 2024

(54) FORECASTING DEVICE USAGE USING MOTIFS OF UNIVARIATE TIME-SERIES DATASET AND COMBINED MODELING

(71) Applicant: HEWLETT PACKARD ENTERPRISE DEVELOPMENT LP, Spring, TX (US)

(72) Inventors: Mantej Singh Gill, Karnataka (IN); Dhamodhran Sathyanarayanamurthy, Karnataka (IN); Madhusoodhana Chari Sesha, Karnataka (IN); Arun Mahendran, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/182,088

(22) Filed: Mar. 10, 2023

(51) Int. Cl.
*G06F 1/18* (2006.01)
*G06F 1/3228* (2019.01)

(52) U.S. Cl.
CPC ............ *G06F 1/189* (2013.01); *G06F 1/3228* (2013.01)

(58) Field of Classification Search
CPC ................................ G06F 1/189; G06F 1/3228
See application file for complete search history.

(56) References Cited

U.S. PATENT DOCUMENTS

| | | |
|---|---|---|
| 2013/0110753 A1 | 5/2013 | Hao et al. |
| 2019/0188201 A1 | 6/2019 | Kotorov et al. |
| 2020/0012902 A1* | 1/2020 | Walters ............... H04L 63/1491 |
| 2021/0223780 A1* | 7/2021 | Bramley .................. G06N 3/04 |
| 2022/0103444 A1 | 3/2022 | Ranjan et al. |
| 2022/0398466 A1* | 12/2022 | Wu ....................... G06N 3/0442 |

OTHER PUBLICATIONS

Kulshreshtha, S., et al.; "An ARIMA- LSTM Hybrid Model for Stock Market Prediction Using Live Data", Aug. 2020, 7 pages.
Qiu, X, et al.; "Empirical Mode Decomposition based Ensemble Deep Learning for Load Demand Time Series Forecasting"; Jan. 2017; 20 pages.
W, Min, et al; "Stock Market Trend Prediction Using High-Order Information of Time Series", Feb. 26, 2019, 10 pages.

* cited by examiner

*Primary Examiner* — Terrell S Johnson
(74) *Attorney, Agent, or Firm* — Sheppard Mullin Richter & Hampton LLP

(57) ABSTRACT

Systems and methods are provided for compressing a time-series dataset from a monitored device into a compressed dataset representation. Using an unsupervised machine learning model, the system may group a contiguous set of datapoints of the time-series dataset and group, using a distance algorithm, the first cluster to a first motif. Many motifs can be generated to identify different data signatures in the time-series dataset. The plurality of motifs can be used to generate a data definition, motif sequence graph, directed graph, or other combinations of datapoints. These datapoints can be combined through a summation process with other datapoints generated by a second machine learning model. The output of the summation process can be used to forecast device usage of a monitored device in a data center.

20 Claims, 11 Drawing Sheets

FORECASTING DEVICE USAGE USING MOTIFS OF UNIVARIATE TIME-SERIES DATASET AND COMBINED MODELING

BACKGROUND

As the complexity, size, and processing capacity of computer systems increase, processes performed by these computer systems continue to grow as well. Monitoring systems have grown in popularity to try to manage the applications executed by the computer systems and increase the overall efficiency of the computer systems. However, this is a difficult task. Data is created at ever increasing rates that make it difficult to review. When the review of the data is passed to a third party, the data received by the third party may not have access to all of the environmental data at the computer system.

Additionally, data room infrastructure is often complex and difficult to track. Appropriate energy metrics are required to determine the power requirements of a server and, more broadly, of a data center. Standard input power supply generation is too often a "one size fits all" strategy, which can increase cost and lower performance and health of a data center. Such problems require pragmatic solutions to assist data center administrators in managing their resources more efficiently and reducing the overall cost associated with running the infrastructure.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
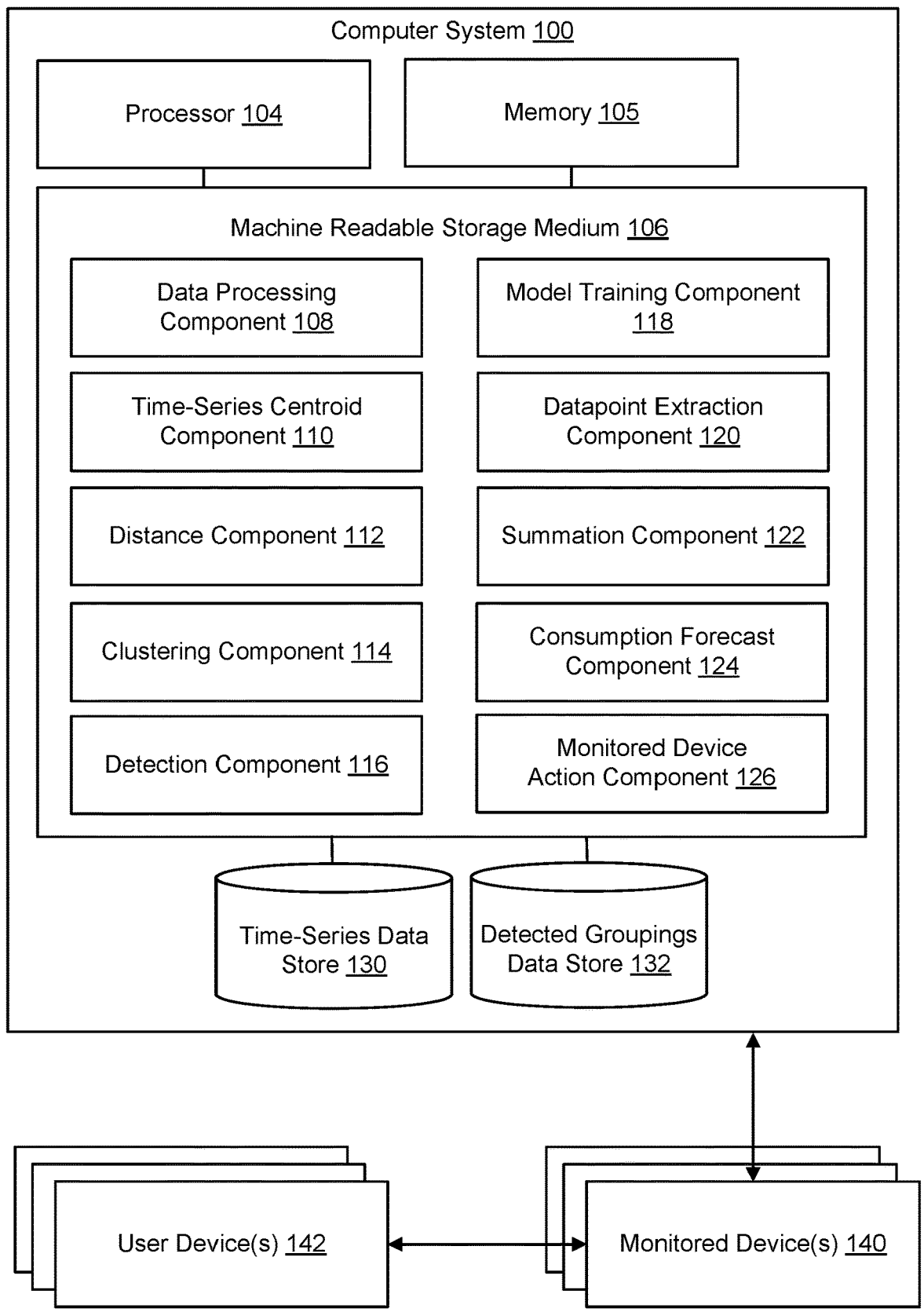
FIG. 1 illustrates a computer system, monitored device, and user devices, in accordance with some examples of the disclosure.

The figures are not exhaustive and do not limit the present disclosure to the precise form disclosed.

DETAILED DESCRIPTION

Data center administrators routinely face challenges of when and how often to introduce a new workload, be it once or periodically. Efficient scheduling of new workloads can help save running costs by avoiding peak hour usage and can help in the long term running efficiency of a server and its periphery. For example, overloading of a power supply unit can cause overheating, which can adversely affect the functioning of the server. Conversely, under-utilization of a power supply unit at various times can lead to inefficiencies and can put undue strain on the power supply unit during other times. Limiting the amount of input power supplied can help reduce waste and avoid superfluous cost in running a server or data center. Conventional approaches to addressing these issues are less optimal than desired. For example, in one conventional approach, a user must provide the server's configuration. This causes a technical problem that limits a dynamic prediction of the power requirement of a server. Thus, the power requirement cannot be dynamically predicted based on the server's historical pattern of power usage and usage of the device is more limited.

With the present disclosure, electric power consumption of each device can be determined and used for gathering power usage requirements of the device. The data may be used to determine the capacity of infrastructure required in the device or data center overall. Such forecast can also help determine the efficiency of a power supply. By virtue of the features of the present disclosure, the power requirement of the device can be dynamically predicted based on its historical pattern of power usage. Devices that are consuming more power or less power (e.g., than the optimal value) can be flagged in order to take appropriate action. The device can run more efficiently, which can cause greater longevity and reliability of the device and its components. The carbon footprint of the device or data center overall can also be reduced.

The prediction forecast can be based on a determination of a plurality of motifs of univariate time-series data and combined modeling of the device or combination of devices in the data center. Motifs represent similarities across the plurality of clusters in the time-series data that can be combined based on data signature similarities. The combined pattern identified in the similarities across the clusters are referred to as "motifs."

The identified similarities of contiguous datapoints across multiple clusters may be determined using various methods. For example, the system may implement an unsupervised machine learning model that is trained to identify and group a contiguous set of datapoints of the time-series dataset into a first cluster. In some examples, an unsupervised machine learning model is trained to identify similar data signatures in each cluster and match the data signatures between clusters in order to form the plurality of motifs. In either sense, the system may extract the motifs from the univariate time-series dataset (e.g. using a customized K-Means algorithm or other clustering algorithm for extracting). The extraction may identify and cluster similar contiguous datapoints and data patterns in the univariate time-series dataset, and output the motifs (e.g., representative of repeated patterns and subsequences).

The plurality of motifs can be used to generate a data definition, motif sequence graph, directed graph, or other combinations of datapoints. These datapoints can be combined through a summation process with other datapoints generated by a second machine learning model. The output of the summation process can be used to forecast device usage of a monitored device in a data center or other prediction forecast.

Technical advantages are realized throughout the application. Systems described herein can more efficiently plan existing workloads or introduce new workloads at more optimal time periods. This can for example prevent overloading the device which may cause overheating, or flag devices in the data center that are consuming less power in order to take appropriate action. Overall cost savings and improved health and longevity of the devices can be realized. Solutions of the present disclosure can be implemented in a number of ways including as Software as a Service (Saas), as Platform as a Service (PaaS), in a cloud-based or cloud computing environment using underlying hardware components, or in a device in an IT data center, among others.

FIG. 1 illustrates a computer system, monitored device, and user devices, in accordance with some examples of the disclosure. In this example, the computer system, illustrated as a special purpose computer system, is labeled as computer system 100. Computer system 100 is configured to interact with monitored device(s) 140 using processor 104, memory 105, and machine readable storage medium 106. Monitored device(s) 140 may interact with one or more user device(s) 142. Computer system 100 may be implemented as a cloud system, data center computer server, as a service, or the like, although such limitations are not required with each embodiment of the disclosure.

Processor 104 may comprise a general-purpose or special-purpose processing engine such as, for example, a microprocessor, controller, or other control logic. Processor 104 may be connected to a bus, although any communication medium can be used to facilitate interaction with other components of computer system 100 or to communicate externally.

Memory 105 may comprise random-access memory (RAM) or other dynamic memory for storing information and instructions to be executed by processor 104. Memory 105 might also be used for storing temporary variables or other intermediate information during execution of instructions to be executed by processor 104. Memory 105 may also comprise a read only memory ("ROM") or other static storage device coupled to a bus for storing static information and instructions for processor 104.

Machine readable storage medium 106 is configured as a storage device that may comprise one or more interfaces, circuits, and modules for implementing the functionality discussed herein. Machine readable storage medium 106 may carry one or more sequences of one or more instructions processor 104 for execution. Such instructions embodied on machine readable storage medium 106 may enable interaction with monitored device(s) 140 to perform features or functions of the disclosed technology as discussed herein. For example, the interfaces, circuits, and modules of machine readable storage medium 106 may comprise, for example, data processing component 108, time-series centroid component 110, distance component 112, clustering component 114, detection component 116, model training component 118, datapoint extraction component 120, summation component 122, consumption forecast component 124, and monitored device action component 126.

Data processing component 108 is configured to receive a time-series dataset and store the data in time-series data store 130. The time-series dataset may be received from a sensor of monitored device 140 and comprise various data signatures at different times. In some examples, the data received from monitored device 140 is limited to what a third party responsible for monitored device 140 is willing to provide. As such, a complete data history or components of the data may not be available when the time-series dataset is received.

Illustrative examples of time-series datasets are provided. For example, the time-series dataset may correspond with monitored device 140 and its input power supply, where input power is provided to monitored device 140 and sampled at an hourly basis. Another example of a time-series dataset corresponds with processor utilization of monitored device 140 as the processor is executing instructions for a plurality of software applications, as illustrated with FIG. 3.

Time-series centroid component 110 is configured to determine each centroid of the time-series dataset in anticipation for grouping a contiguous set of datapoints in the data as a first cluster in a plurality of clusters. For example, an unsupervised machine learning model may group the contiguous set of datapoints of the time-series dataset into a first cluster by algorithmically determining the centroid of each contiguous grouping.

The centroids can be initialized using various methods, including a random selection (e.g., a random selection of data points in the received dataset), trained machine learning model, a K-Means cluster algorithm or K-Means++ (e.g., by assigning each data point to the cluster with the nearest mean, not minimum/maximum), or by initializing the centroids with outlier points in a customized K-Means cluster algorithm.

In some examples, the clustering algorithm (e.g., a custom K-means algorithm) can be configured to analyze a small subset of the univariate time-series dataset to find local minima and maxima of subsets of the time-series dataset, which can then be associated with a nearest centroid using a skewed Euclidean distance function. This creates some number of clusters, after which, the position of those nearest centroids are calculated again until the data associated with a centroid no longer changes, but rather remains consistent. These eventually become the clusters that are analyzed to identify "motifs." As discussed herein, motifs represent similarities across the plurality of clusters that computer system 100 can combine based on data signature similarities.

The customized K-Means cluster algorithm may consider the linear fashion that the time-series dataset was recorded in determining each cluster centroid (e.g., contiguous data points). In this sense, time-series centroid component 110 can group data points that are near in time to each other so they are more likely to be grouped with other readings from the same application, which are stored in detected groupings data store 132. The clusters may comprise centroids, outlier points, and local maxima and local minima. The local maxima and local minima may be determined to segregate the cluster into smaller clusters, where each smaller cluster can include one significant minima or maxima point.

To find the local minima and maxima on a very small subset of time-series data, time-series centroid component 110 may use an outlier centroid initialization method or other distance algorithm. For example, first, time-series centroid component 110 may assume the recently found centroids are "k" in number. Next, each data point may be associated with the nearest centroid (e.g., using the skewed Euclidean distance function). This may divide the data points into k clusters. With the clusters, then, time-series centroid component 110 may re-calculate the position of centroids using the skewed Euclidean distance function or other distance algorithm. Any of these steps may be repeated until there are no more changes in the membership of the data points, including dividing the data points into "k" clusters and calculating the position of centroids using the skewed Euclidean distance function, until there are no more changes. Time-series centroid component 110 may provide or output the data points with cluster memberships.

In some examples, time-series centroid component 110 may determine the number of clusters in an automated and dynamic process. The clusters may not be defined manually. In this example, the number of clusters may be based on the number of maxima and minima points in the time-series dataset that were each grouped as a contiguous set of datapoints of the time-series dataset. Illustrative examples of minima and maxima are provided in FIG. 4.

In some examples, the minima and maxima determined by time-series centroid component 110 may correspond with actual values from the time-series dataset. The centroid of the cluster may not be chosen from a value that is not included with the dataset (e.g., a mean or average value). Rather, the minima and maxima may correspond with actual data points received from monitored device 140.

Distance component 112 is configured to determine a distance between each of the data points and centroids in the clusters, with respect to the time-series constraint (e.g., along a linear time series). This may improve standard distance functions that may wrongly cluster data points without respect to the linear inherency of time-series data.

The distance formula may determine an amount of change in the time axis (e.g., x-axis) as weighed less compared to the same amount of change on the performance metric axis (e.g., y-axis) so that data points can be clustered following the time axis. One example of a genre of distance formula that can be used is:

$$d = \sqrt{(x_2 - x_1)^2 + (y_2 - y_1)^4}$$

Where "4" may be replaced with an "n" value that is an even number, and greater than or equal to 4. The value may be configurable and customized by a user operating user device 142. This value may be an exponential multiplier of the "y" portion of the formula, which is usually set to a fraction value. When the fraction value is raised to a higher power "n," the "y" portion of the formula may become smaller. More weight may correspond with the x-axis, which corresponds with the time values and can group the time-series data along the linear path.

Clustering component 114 is configured to determine one or more clusters. For example, clustering component 114 may receive the local minima and maxima of subsets of the time-series dataset and the nearest centroid (determined from time-series centroid component 110). The two datasets may be correlated to form a plurality of clusters, then the position of the nearest centroids may be calculated again until the calculated centroid no longer changes, but rather remains consistent. These become the clusters that are analyzed to identify the motifs, where additional clusters may be grouped with existing motifs that already contain similar clusters.

Detection component 116 is configured to implement dynamic time warping (DTW) process on the defined clusters to detect similarities between the clusters (e.g., in terms of the data points forming a spike, dip, or other shape within each cluster) and generate one or more motifs. The DTW process can calculate an optimal match between two time-series datasets by measuring the similarity between the two datasets along the linear time sequence. The optimal match may satisfy various restrictions including, for example, every index from the first sequence may be matched with one or more indices from the other sequence, and vice versa, the first index from the first sequence may be matched with the first index from the other sequence (but it does not have to be its only match), the last index from the first sequence may be matched with the last index from the other sequence (but it does not have to be its only match), or the mapping of the indices from the first sequence to indices from the other sequence may be monotonically increasing, and vice versa. The optimal match may also satisfy a minimal cost, where the cost is computed as the sum of absolute differences, for each matched pair of indices, between their values. The similar clusters may be grouped in a motif. A plurality of motifs can be generated for each of the similar cluster groups.

In some examples, detection component 116 may include a parameter, "c", which decides the minimum threshold for accepting if two subsequences are similar or not. The threshold value "c" may be inversely proportional to the compression ratio. In other words, for a higher compression ratio, the value of "c" will be lower.

The results may be stored as an in-memory object, for example, in detected groupings data store 132. The dataset may comprise each motifs' metadata along with the indices of the similar subsequences for each motif. The metadata may comprise, for example, values along the x-axis (time) and y-axis (computational value) and indices of the closest or contiguous datapoint members of sequences for the application at the monitored device. The compressed dataset representation may store this or other metadata, which can describe each of the plurality of motifs and time-based indices of clusters grouped into each respective motif.

The compressed dataset representation may be stored in accordance with a data schema format (e.g., in a JSON format or in time-series data store 130). Since the motifs can define patterns in the data (e.g., corresponding with data signatures of applications at monitored device 140), the patterns, rather than the individual points of data, may be stored in the dataset representation in accordance with the data schema format. In other words, the dataset representation may represent the entire time-series dataset in a compressed format to take up a reduced memory capacity. Once the dataset representation for each motif is generated, the dataset representation may be used to generate a new, compressed dataset that uses less memory. The compressed dataset may be stored in place of the original univariate time-series dataset, and in some examples, the original univariate time-series dataset may be deleted to conserve memory space.

The properties of the data schema may include, for each data point in the motif (e.g., cluster of datapoints), a unique identifier, time start, time stop, and number of points that are defined for the motif. The data schema may also define the frequency of each of the data points and the closest members of the data points in the motif.

The number of properties or values may be stored in a data structure, like an array data structure. The data structure may include the dataset representation for each motif and may be adjusted using an accuracy value. The accuracy value may be set by a system administrator to identify the number of parameters to define for the dataset representation of each motif. A larger accuracy value (e.g., greater than or in excess of a threshold accuracy value) may define more detail in the dataset representation with greater accuracy between the repopulated time-series dataset and the original time-series dataset, which may result in a larger memory space required to store the dataset representation and repopulated data. A smaller accuracy value (e.g., less than the threshold accuracy value) may define less detail in the dataset representation with less accuracy between the repopulated time-series dataset and the original time-series dataset, which may result in less memory space required to store the dataset representation and repopulated data.

Model training component 118 is configured to receive the time-series dataset as input to the machine learning model. For example, model training component 118 receives and processes or transforms data stored in time-series data store 130. This may include detecting and removing outliers in the time-series dataset (e.g., of processor usage, input power periodic data, or software application execution at monitored device 140). This includes linearly interpolating any missing values in the time-series dataset and removing outliers in the data using model training component 118. In some examples, a pre-trained machine learning model may implement anomaly detection and removal of outliers (e.g., One-Class SVM). The data may be resampled, and only the average power consumed by monitored device 140 may be captured at every interval (e.g., every hour or every two hours or any suitable interval). The refined time-series data may be the base dataset for training and validating the output generated by the ML model.

Model training component 118 is configured to determine output from the time-series dataset, including trend (e.g., long-term direction), seasonality (e.g., calendar-related movements), cyclic (e.g., systematic), and residual (e.g., unsystematic or short-term fluctuations) components (referred to as "seasonality" for short). In this example, the existing algorithms forecast a smooth curve that tries to balance out the trend and seasonal components but may ignore the smaller maxima and minima, considering them under the residual component. In the case of power supply and CPU data of monitored device 140, the residual component may have more meaning and include information about the effect of the application or workload running on monitored device 140. As such, the output corresponding with trend, seasonality, cyclic, and residual components can be (eventually) combined with the motif data described above when trying to forecast time-series data.

In one non-limiting example, the past 70 days of data are used for training and validating the output generated by the ML model (e.g., the prediction of usage of monitored device 140). In another non-limiting example the past 12 months of data are used. Techniques such as Mean Absolute Percentage Error and Root Mean Square Error can be used to validate the output. For example, from the base dataset, the first 70 days of data can be used for training a model for a server, and after successful training, the next 20 days of the dataset can be used for validation. This process can be repeated on multiple monitored devices 140. In some examples, a parameter of the past "X" days of data can be set as the minimum time period of data that is required for the processing. Until "X" days of data are included, no data processing may be performed.

Challenges in selecting and implementing the training method include large training time due to limited hardware resources. One method of training to overcome such challenges is to distribute training over multiple virtual machines (VMs) to generate models for each monitored device 140, and re-training with a warm-start strategy for shorter re-training time. The training can be optimized using scripts written to dynamically choose the best set of hyperparameters for each of the models. In one non-limiting example, the hyperparameters with the below combinations of parameter and their values can be used:

Changepoint_prior_scale: [0.001, 0.01, 0.05]. This parameter determines the flexibility of a trend, and in particular how much the trend changes at the trend changepoints. If too small, the trend may underfit the data and variance that should have been modeled with trend changes can instead be handled with the noise term. If too large, the trend may overfit and can model yearly seasonality. The default value of 0.05 can be used for many time-series datasets initially and may be tuned as time progresses. An example range may be about [0.001, 0.5].

Seasonality_prior_scale: [0.01, 0.1, 1.0, 10]. This parameter controls the flexibility of the seasonality. Similarly, a large value allows the seasonality to fit large fluctuations, and a small value shrinks the magnitude of the seasonality. The default is 10, which applies basically no regularization. An example range for tuning this parameter may be about [0.01, 10]; when set to 0.01 one should find that the magnitude of seasonality is forced to be very small.

Daily_seasonality: [True, False].

Growth: logistic.

Model training component 118 is also configured to use the dataset(s) to train a ML model to obtain forecasted data of monitored device 140 for a next or future time period. Various ML models or algorithms may be used for this purpose, including FBProphet, SARIMA/SARIMAX, Holt-Winter-ES, and Gated Recurrent Unit (GRU) Network. These models have appropriate training time and size to work with the techniques of the present disclosure. In one example, the train-test split was 80-20 percent.

FBProphet is open-source software that can be implemented by model training component 118. FBProphet is a procedure for forecasting time-series data based on an additive model where non-linear trends are fit with yearly, weekly, and daily seasonality, plus holiday effects. FBProphet can work well with the time-series dataset or any other datasets that have strong seasonal effects and several seasons of historical data. FBProphet is robust to missing data and shifts in the trend, and typically handles outliers well.

SARIMA is a class of statistical models for analyzing and forecasting time-series data. SARIMA is a generalization of another model named "AutoRegressive Moving Average" and adds the notion of integration. Parameters of the SARIMA model are defined as p, d, and q. "p" is the number of lag observations included in the model, also called the "lag order." "d" is the number of times that the raw observations are differenced, also called the "degree of differencing." "q" is the size of the moving average window, also called the "order of the moving average." The python package "pmdarima" (Auto-ARIMA) can be used to find the right set of parameters corresponding with (p, d, q) that exhibit a low AIC (Akaike information criterion) value for each monitored device 140.

Holt-Winters Exponential Smoothing (ES) can be used for forecasting time-series data that exhibits both a trend and a seasonal variation. Holt-Winters-ES can be a powerful prediction algorithm despite being a relatively simple model. Holt-Winters-ES can handle the seasonality in the data set just by calculating the central value and then adding or multiplying the central value to the slope and seasonality, given the right set of parameters for choosing:

level $L_t = \alpha(y_t - S_{t-1}) + (1-\alpha)(L_{t-1} + b_{t-1})$ trend $b_t = \beta(L_t - L_{t-1}) + (1-\beta)b_{t-1}$ seasonal $S_t=\gamma(y_t-L_t)+(1-\gamma)S_{t-s}$ forecast $F_{t+k}=L_t+kb_t+S_{t+k-1}$ Gated Recurrent Unit (GRU) Network is a gating mechanism in Recurrent Neural Networks (RNNs) that uses connections through a sequence of nodes to perform machine learning tasks associated with memory. GRU can also solve the vanishing gradient problem that comes with a standard recurrent neural network (RNN). To solve the vanishing gradient problem of a standard RNN, GRU uses an update gate and a reset gate. In some examples, the two gates are two vectors that decide what information should be passed to the output. The gates may be trained to keep information from long past time periods, without minimizing the detail collected in the time-series dataset through time or removing information that is irrelevant to the prediction.

Using any of these or other models, model training component 118 may generate the prediction forecast as a dataset that can be stored as an in-memory object, for example, in detected groupings data store 132. The prediction forecast and compressed dataset representation of the plurality of motifs may be stored here.

In some examples, the prediction forecast may both be stored in accordance with a data schema format (e.g., in a JSON format). Since the prediction forecast can define patterns in the data (e.g., corresponding with data signatures of seasonality trends at monitored device 140), the patterns, rather than the individual points of data, may be stored in the dataset representation in accordance with the data schema format. The properties of the data schema may include a unique identifier, time start, time stop, and number of points that are defined for each data signature. The number of properties or values may be stored in a data structure, like an array data structure. The data structure may include the dataset representation for each prediction forecast and may be adjusted using an accuracy value.

In some examples, model training component 118 is configured to train the first machine learning model that generates the motif prediction forecast and also train the second machine learning model that generates the seasonality prediction forecast in parallel. In other words, two machine learning models may be trained in parallel. The output from the first and second machine learning model may be provided to the summation process executed by summation component 122.

Various machine learning models such as the above can learn and predict power consumption or other metrics (e.g., each prediction forecast) of monitored device 140 for a next or future time period, which is determined by consumption forecast component 124. A check can be included for whether the prediction forecast was successful and, if so, the prediction forecast (e.g., for the next 20 days or the next 30 days in non-limiting examples) may be passed to consumption forecast component 124.

Datapoint extraction component 120 is configured to access detected groupings data store 132 and determine a dataset representation of each of the plurality of motifs and prediction forecasts in the data schema formats (e.g., in a JSON format).

In some examples, datapoint extraction component 120 is configured to generate a motif sequence graph of each motif in the compressed dataset representation (e.g., stored in accordance with the data schema format). The motif sequence graph can be used to represent multiple sequences within the plurality of motifs using an edge representing homology between segments. In some examples, if there are multiple possible paths when traversing a thread in a sequence graph, multiple sequences can be represented by the same thread. As such, it is possible to create a motif sequence graph that represents a plurality of motifs with each motif corresponding to one path through the graph.

In some examples, datapoint extraction component 120 is configured to generate a directed graph of the motif in the compressed dataset representation (e.g., stored in accordance with the data schema format). The directed graph may assign weights to the arrows, edges, and nodes to help identify the probability of traversing a particular sequence in the directed graph for a particular time interval. An illustrative directed graph is provided with FIG. 8.

Summation component 122 is configured to aggregate the prediction forecast for each time point in the time-series dataset, using both values produced from the first machine learning model (e.g., the motif prediction forecast) and the second machine learning model (e.g., the seasonality prediction forecast). The aggregation of the prediction forecast values may be performed during a summation process performed by summation component 122. In providing the summation process, summation component 122 can generate the somewhat jaggedness produced in the original time-series data, and abstracted by the compressed dataset representation output by the first machine learning model, with an added seasonality produced by the second machine learning model. An illustrative aggregation of the prediction forecast values is provided with FIG. 9.

Consumption forecast component 124 is configured to identify time windows in the prediction forecast (e.g., power consumption, application execution, etc.). This can be done by calculating an exponential mean average (EMA) of the forecasted time-series dataset. The prediction forecast that exceeds an overutilization threshold or falls below an underutilization threshold may be identified. The prediction forecast can determine overutilized or underutilized time for monitored device 140. This prediction forecast can be used by a user or data administrator unit to schedule a new workload or to revise an existing workload.

Monitored device action component 126 is configured to identify actions to take at monitored device 140 based on the prediction forecast determined by consumption forecast component 124. As an illustrative example, a user or data administrator unit may specify a time window of "t" hours (e.g., 5 hours in a non-limiting example), in order to find a time window of "t" hours to run a new workload. In that case, if underutilization is identified, monitored device 140 may be a good candidate for scheduling a new workload. In the case overutilization is identified, monitored device 140 may be a good candidate for moving a processing job to another machine or preventing any new processes from starting.

Additional details regarding analytical operations, output, and actions corresponding with the time-series datasets described herein is provided in U.S. patent application Ser. Nos. 17/991,500, 17/862,989, and 18/160,063 which are herein incorporated by reference in their entirety for all purposes.

Figure 2:
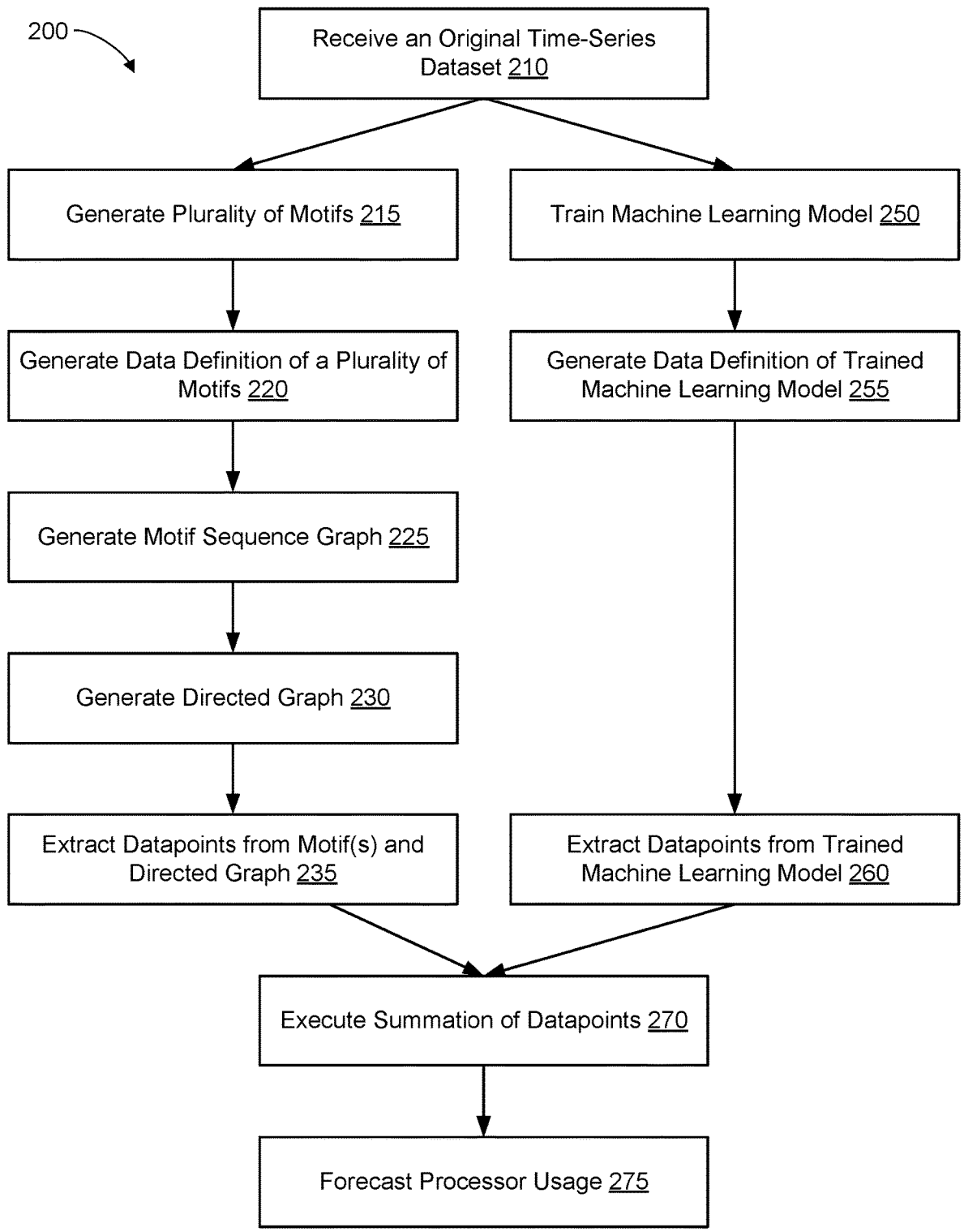
FIG. 2 illustrates a process for determining a prediction forecast using motifs and combined modeling, in accordance with some examples of the disclosure.

FIG. 2 illustrates a process for determining a prediction forecast using motifs and combined modeling, in accordance with some examples of the disclosure. Computer system 100 of FIG. 1 may be configured to execute machine-readable instructions to perform the process 200 described herein.

At block 210, an original time-series dataset may be received. For example, computer system 100 may receive the time-series dataset that includes data points corresponding with a monitored device or a monitored distributed system with several monitored devices. The time-series dataset can comprise CPU utilization, use of a sensors incorporated with the monitored device, or other univariate time-series data.

At block 215, a plurality of motifs may be generated. For example, computer system 100 may group the time-series dataset into a plurality of clusters, including identifying a pattern of spikes or dips in the original time-series dataset and grouping each cluster as corresponding with the same activity at the monitored device. The original time-series dataset may correspond with a plurality of these clusters across time intervals. The system may further identify similarities across the plurality of clusters and combine a subset of the plurality of clusters based on data signature similarities to form a plurality of motifs using an unsupervised machine learning model, as further described herein.

In some examples, the plurality of motifs may be previously generated and a cluster may be added to one or more of the motifs. For example, a contiguous set of datapoints of the original time-series dataset may be grouped into a first cluster. The grouping may be executed using any method discussed herein, including using an unsupervised machine learning model. The cluster may then be grouped into a first motif when the cluster is similar to other clusters of the first motif. The grouping may be executed using any method discussed herein, including using a distance algorithm.

In some examples, a data schema may be accessed. For example, computer system 100 may access a data schema corresponding with time-series dataset. The parameters of the data schema may comprise a type of the data structure (e.g., an array of type "object"), properties including datapoint, frequency, and closest members, and whether the particular property is required or not. Each datapoint property of the data schema may comprise type (e.g., object), unique identifier (e.g., integer value), time start (e.g., string of characters or integer value), time stop (e.g., string of characters or integer value), and number of points.

At block 220, a data definition may be generated for a plurality of motifs using the data schema. The compressed dataset representation may identify values for each property of the motif. For example, for a particular motif, the data of the monitored device may include ten spikes within ten seconds, in general. The data schema may include properties for "spikes" and "frequency," and the compressed dataset representation of the particular motif may define the values for those properties (e.g., of the ten spikes within ten seconds). Using this compressed dataset representation of the motif, the detail of the particular motif may be abstracted and stored in the format corresponding with the data schema.

The level of detail of the compressed dataset representation may correspond with an accuracy value, discussed herein as parameter "c", which decides the minimum threshold for accepting if two subsequences are similar or not. To do this, the accuracy value corresponds with a minimum threshold value for accepting if two subsequences are similar or not and the parameter "c" may be inversely proportional to the compression ratio. In other words, for a higher compression ratio, the parameter "c" would be lower. The accuracy value may be set by a system administrator.

In some cases, a larger accuracy value (in excess of a threshold accuracy value) may correspond with more detail in the compressed dataset representation and greater accuracy between the repopulated time-series dataset and the original time-series dataset, which may result in a larger memory space required to store the compressed dataset representation and repopulated data. A smaller accuracy value (less than the threshold accuracy value) may correspond with less detail in the compressed dataset representation and less accuracy between the repopulated time-series dataset and the original time-series dataset, which may result in less memory space required to store the compressed dataset representation and repopulated data.

Multiple dataset representations may be generated, where each compressed dataset representation corresponds with each of the plurality of motifs. In other words, the original time-series dataset that was used to generate the plurality of motifs may be compressed and represented as one or more dataset representations.

The processes defined herein may generate a compressed dataset representation defining a compressed dataset of the original time-series dataset. The compressed time-series dataset may be defined by the compressed dataset representation that can be used to generate repopulated data with similar, repeating data patterns as the original time-series dataset but with fewer anomalies and distinctions found in the original time-series dataset.

At block 225, a motif sequence graph may be generated. For example, a motif sequence graph may be generated of each motif in the compressed dataset representation to represent multiple sequences within the plurality of motifs using an edge representing homology between segments. In some examples, if there are multiple possible paths when traversing a thread in a sequence graph, multiple sequences can be represented by the same thread. As such, it is possible to create a motif sequence graph that represents a plurality of motifs with each motif corresponding to one path through the graph.

At block 230, a directed graph may be generated. For example, a directed graph may be generated. The directed graph may represent a plurality of motifs in the compressed dataset representation. The directed graph may assign weights to the arrows, edges, and nodes to help identify the probability of traversing a particular sequence in the directed graph for a particular time interval.

At block 235, datapoints may be extracted from a motif and a directed graph. For example, the process may access detected groupings data store 132 in FIG. 1 and determine a dataset representation of each of the plurality of motifs and prediction forecasts in the data schema formats (e.g., in a JSON format).

At block 250, a machine learning model may be trained. This may refer to the second machine learning model. For example, the process may receive the time-series dataset as input to the second machine learning model. The process may detect and remove outliers in the time-series dataset, including linearly interpolating any missing values in the time-series dataset and removing outliers in the data. In some examples, a pre-trained machine learning model may implement anomaly detection and removal of outliers (e.g., One-Class SVM). The data may be resampled. The refined time-series data may be the base dataset for training and validating the output generated by the ML model.

In some examples, the second machine learning model is configured to determine output from the time-series dataset, including trend (e.g., long-term direction), seasonality (e.g., calendar-related movements), cyclic (e.g., systematic), and residual (e.g., unsystematic or short-term fluctuations) components (referred to as "seasonality" for short). In this example, the existing algorithms forecast a smooth curve that tries to balance out the trend and seasonal components but may ignore the smaller maxima and minima, considering them under the residual component. The algorithms may include, for example, including FBProphet, SARIMA/SARIMAX, Holt-Winter-ES, and Gated Recurrent Unit (GRU) Network. As such, the output corresponding with trend, seasonality, cyclic, and residual components can be (eventually) combined with the motif data described with block 220 when trying to forecast time-series data.

At block 255, a data definition of the trained machine learning model may be generated. The second data definition may identify trend, seasonality, cyclic, and residual components. The data schema can include properties of these components to represent the detail of each of these effects on the time-series dataset. The data may be abstracted and stored in the format corresponding with the data schema.

At block 260, datapoints may be extracted from the second trained machine learning model. For example, the second data definition of the trained machine learning model may be accessed and datapoints form the second data definition may be extracted corresponding with the trend, seasonality, cyclic, and residual components in the compressed data format.

At block 270, a summation process may be executed on the datapoints, using each of the first and second extracted datapoints. An aggregate the prediction forecasts may be generated. The aggregation may include both values produced from the first machine learning model (e.g., the motif prediction forecast) and the second machine learning model (e.g., the seasonality prediction forecast). The aggregation of the prediction forecast values may be performed during a summation process that can generate the somewhat jaggedness produced in the original time-series data, and abstracted by the compressed dataset representation output by the first machine learning model, with an added seasonality generated by the second machine learning model.

At block 275, device or processor usage may be forecast. For example, the aggregated output from the first trained ML model and the second trained ML model may be used to obtain forecasted data of monitored device 140 in FIG. 1 for a next or future time period. The forecast may include, for example, time windows in the prediction forecast (e.g., power consumption, application execution, etc.) so that an excess of the overutilization threshold or an identification below an underutilization threshold may be identified. This prediction forecast can be used by a user or data administrator unit to schedule a new workload or to revise an existing workload.

Figure 3:
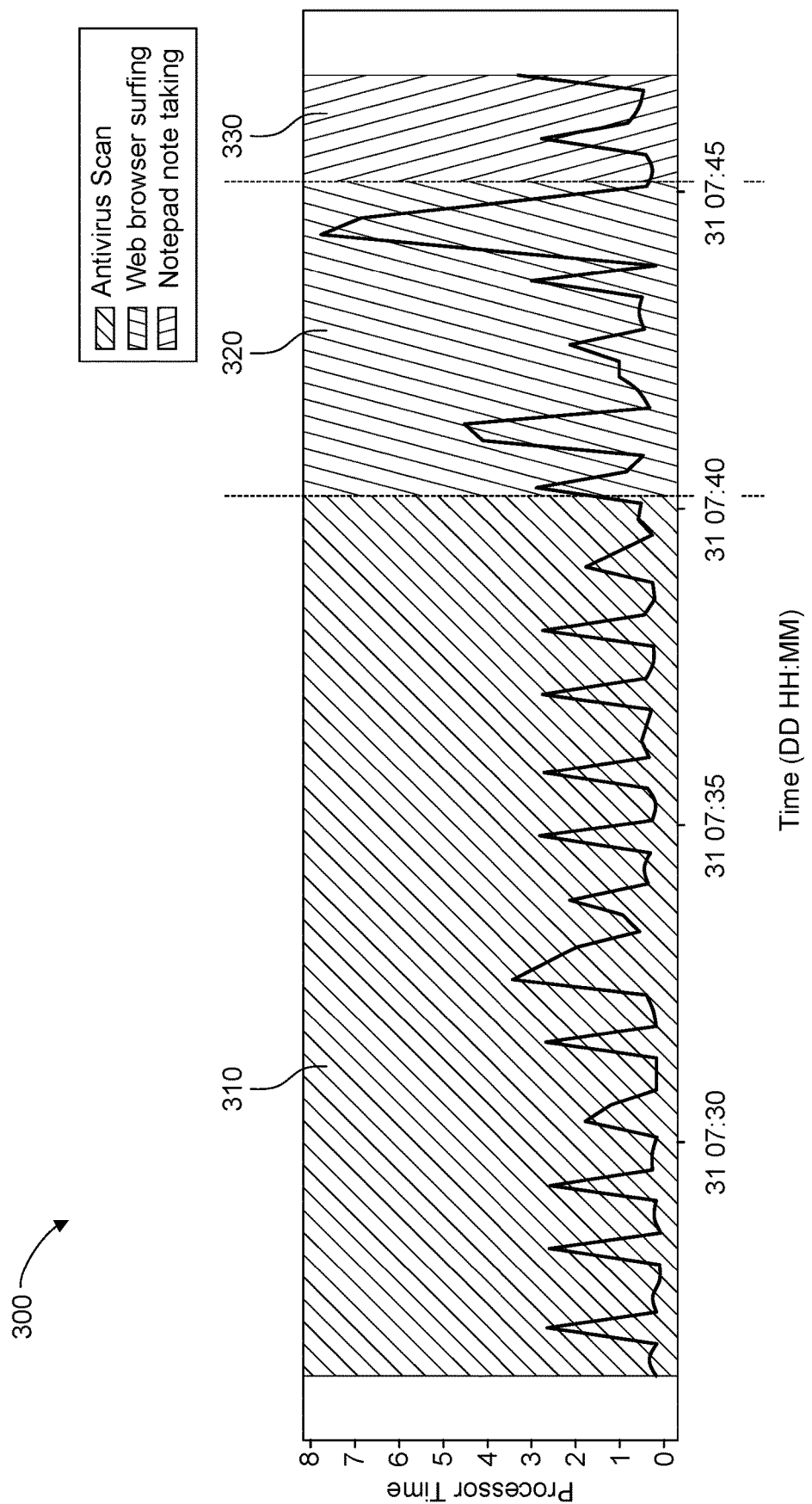
FIG. 3 provides an example of time-series data, in accordance with some examples of the disclosure.

FIG. 3 provides an example of time-series data, in accordance with some examples of the disclosure. In example 300, the processor time is identified for a monitored device that runs three different applications during 15 seconds, illustrated as first application 310 (e.g., an antivirus scan), second application 320 (e.g., a web browser video), and third application 330 (e.g., a notepad application). Each of the applications run without overlapping processor time to illustrate the distinctions between the signatures. In this example, the applications 310, 320, and 330 were run independently, exclusively, and consecutively to observe the difference in the time-series signature of each application.

Figure 4:
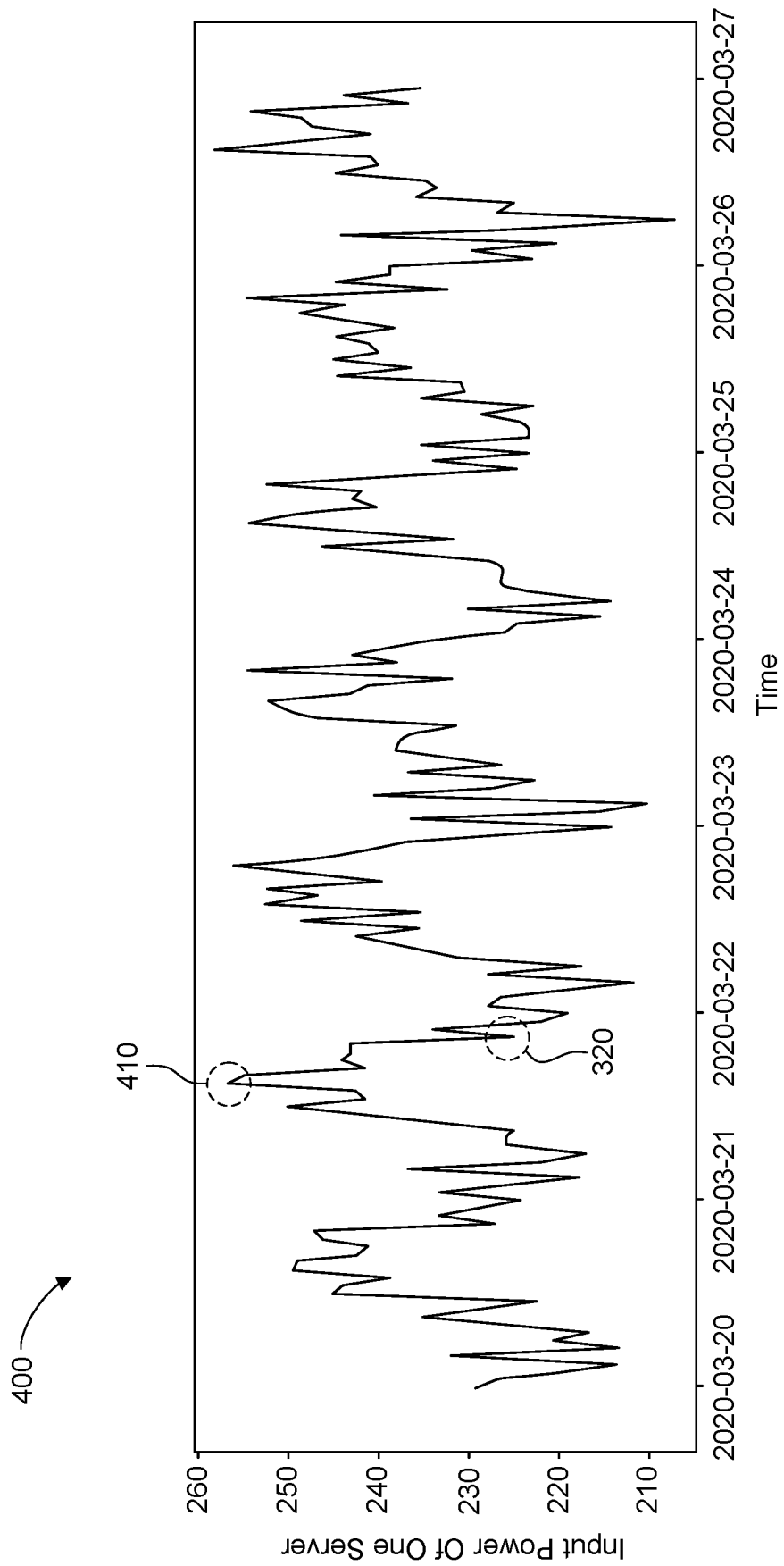
FIG. 4 provides an example of minima and maxima of the time-series data, in accordance with some examples of the disclosure.

FIG. 4 provides an example of minima and maxima of the time-series data, in accordance with some examples of the disclosure. In example 400, an illustrative time-series dataset is provided with an illustrative maxima data point 410 and an illustrative minima data point 420. For example, each instance where the points in the dataset, along a linear progression of the time series, changes direction (e.g., progresses from increasing to decreasing, or from decreasing to increasing, etc.), a minima point or a maxima point may be identified. In some examples, time-series centroid component 110 is configured to store the minima or maxima in time-series data store 130.

Figure 5:
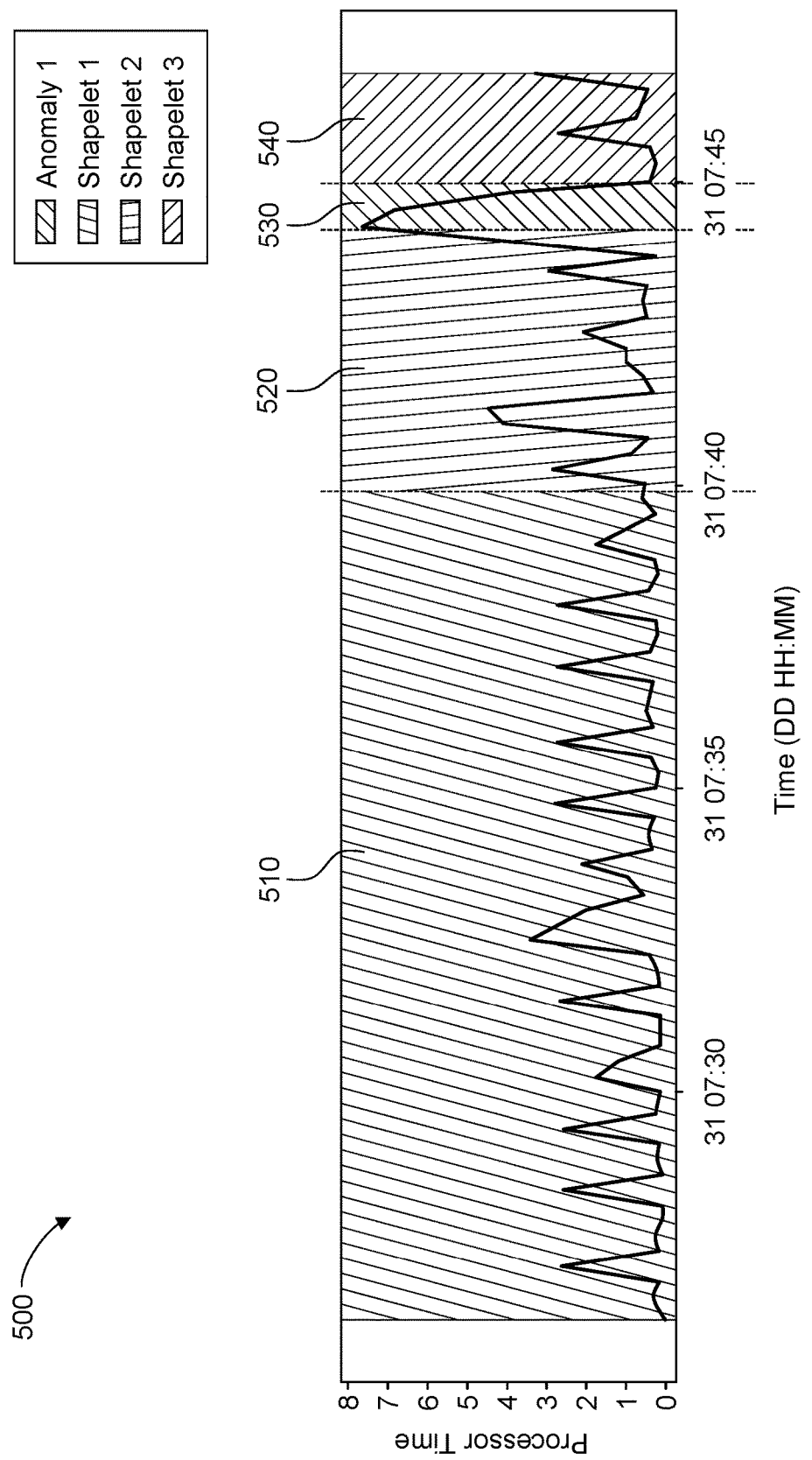
FIG. 5 provides an example of time-series data with the outlier identified, in accordance with some examples of the disclosure.

FIG. 5 provides an example of time-series data with the outlier identified, in accordance with some examples of the disclosure. In example 500, the time-series data is repeated from example 300 of FIG. 3, where the processor time is identified for a monitored device that runs three different applications during 15 seconds, including first application 510 (e.g., an antivirus scan), second application 520 (e.g., a web browser video), and third application 540 (e.g., a notepad application). Additionally, an outlier is identified between the second application and third application, illustrated as outlier 530.

Figure 6:
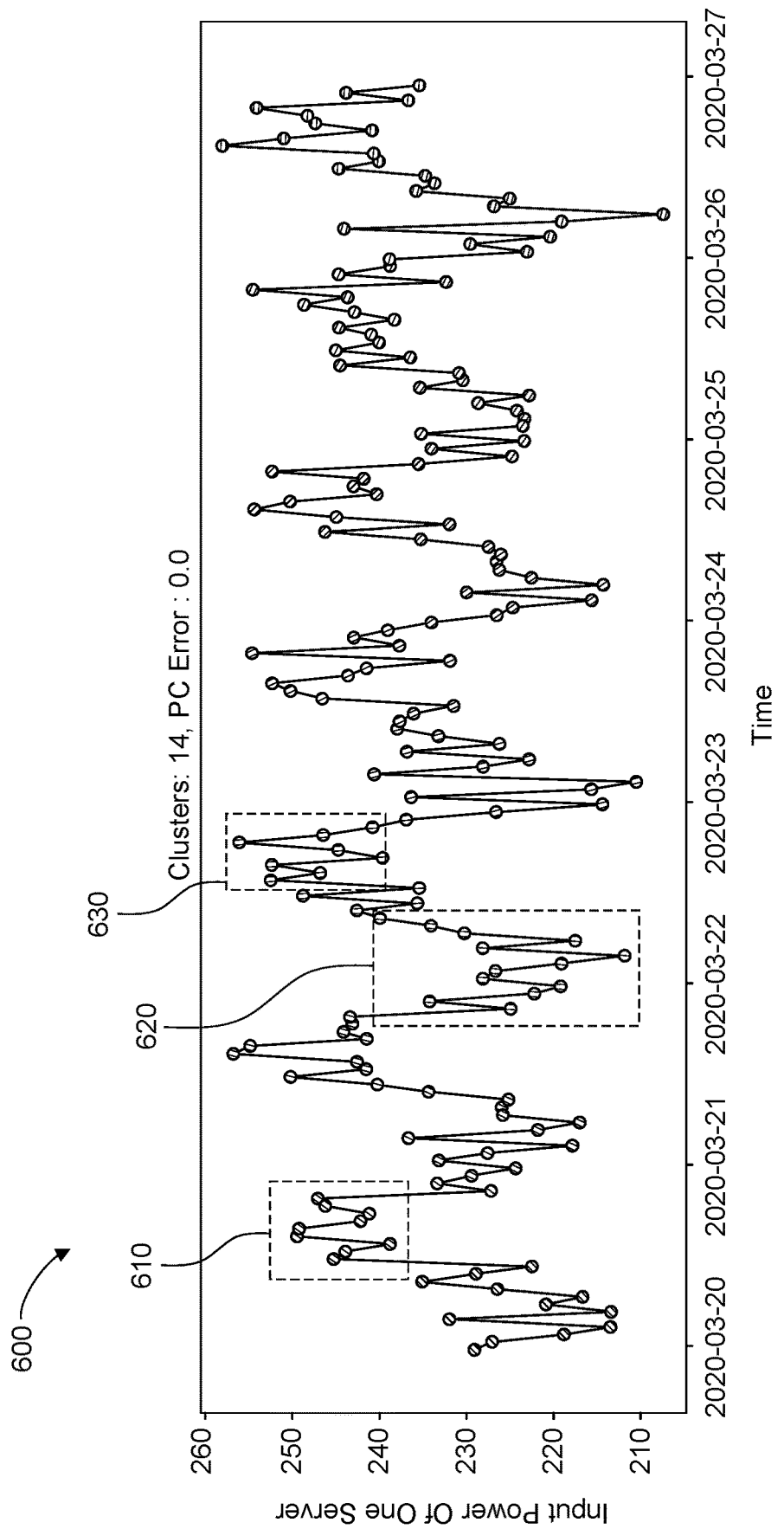
FIG. 6 provides an example of time-series data with clusters identified, in accordance with some examples of the disclosure.

FIG. 6 provides an example of time-series data with clusters identified, in accordance with some examples of the disclosure. In example 600, the time-series data is analyzed and grouped as a plurality of clusters, where the data signature similarities are used to form a plurality of motifs using an unsupervised machine learning model. Illustrative clusters are provided, shown as first cluster 610 and second cluster 620. These clusters may help create labeled time-series data, where each cluster corresponds with a different label (e.g., different application or data signature, etc.). A similar cluster to first cluster 610 is identified as a third cluster 630, which have a similar data signature determined using the unsupervised machine learning model. The model may be trained to identify similar data signatures in each cluster and match the data signatures.

In this context, each cluster of similar curves can be grouped into a motif. As discussed herein, each motif may represent a repeated pattern and subsequence of data points that are grouped into each cluster. The distance algorithms discussed herein may help find curve similarities between the clusters. As illustrated in FIG. 5, multiple similar shapes of data points in first application 510 (e.g., an antivirus scan) are each motifs of the dataset. Multiple motifs may be combined to form a shapelet, which may correspond with the entire dataset corresponding with first application 510.

Figure 7:
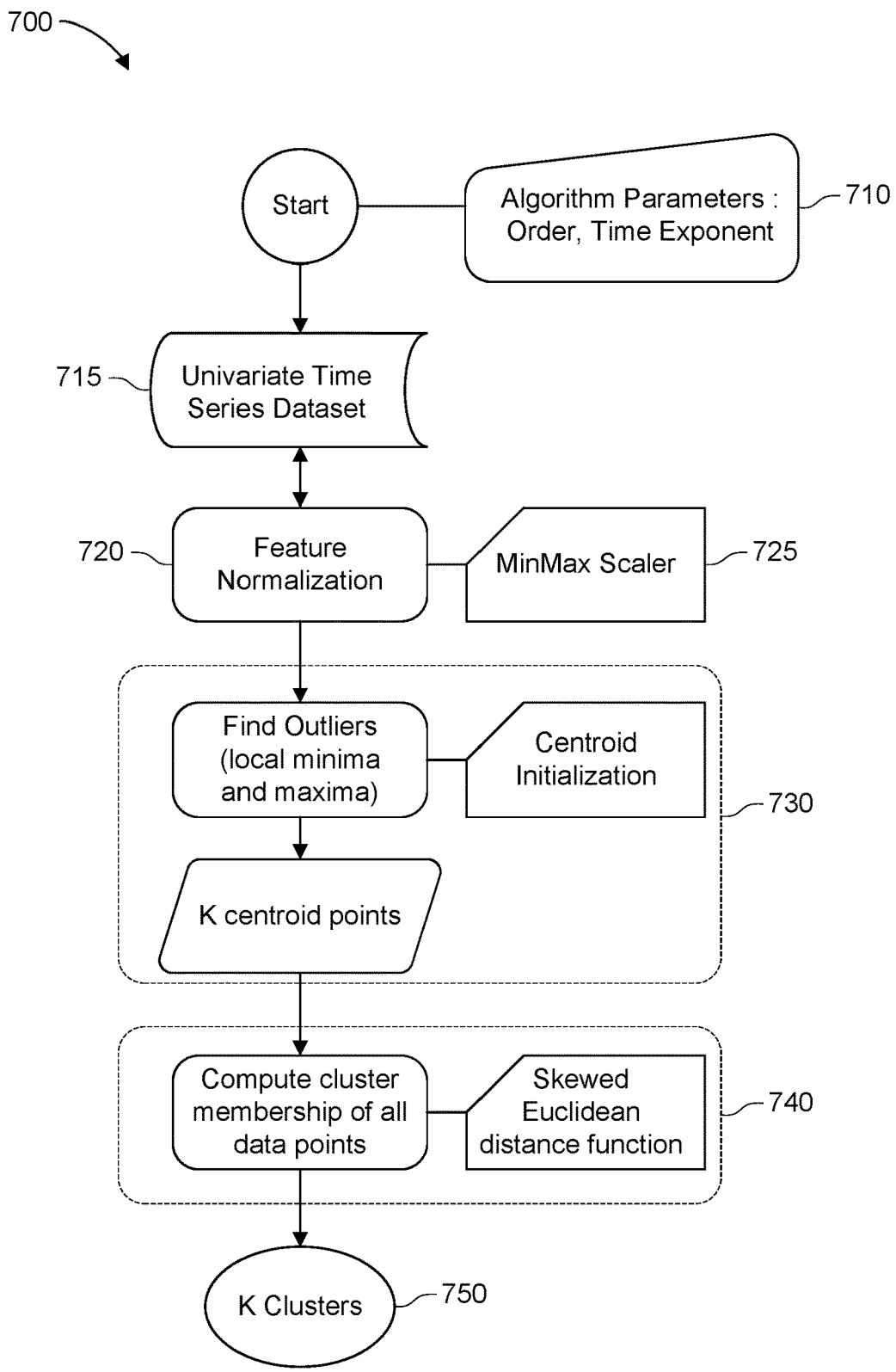
FIG. 7 illustrates a process for generating one or more clusters data, in accordance with some examples of the disclosure.

The clusters may be formed using various processes, including the process illustrated in FIG. 7 to implement a custom K-Means clustering algorithm with outlier centroid initialization and a skewed Euclidean distance function. In illustrative example 700, clustering component 114 of FIG. 1 may perform one or more steps to determine the plurality of clusters.

At block 710, the input may include algorithm parameters, some of which may be altered by a user operating user device 142 of FIG. 1. The input may include, for example, input data points D, an order parameter θ, and a time component N in order to generate data points with cluster memberships.

At block 715, the time-series dataset may be received (e.g., by data processing component 108 of FIG. 1). The time-series dataset may be received from a sensor of monitored device 140 and comprise various data signatures at different times.

At block 720, the data may be processed, including implementing a feature normalization on the time-series dataset. For example, feature normalization may scale the individual samples of data from the time-series dataset to have common and consistent unit measurements.

At block 725, the data may be further processed, including implementing a scaler process on the time-series dataset. The scaler process can help improve wide variations in the data to create small standard deviations of features and preserve zero entries in sparse data.

At block 730, clustering component 114 of FIG. 1 may receive the local minima and maxima using the outlier centroid initialization method to obtain centroids c1, c2, . . . ck. As discussed with the process performed by distance component 112 of FIG. 1, the order parameter may be adjusted to determine various centroids.

At block 740, for each data point $x_i$, find the nearest centroid (c1, c2, . . . ck) using the Skewed Euclidean distance function and assign the point to that cluster. The Skewed Euclidean distance function may comprise the distance formula as discussed with distance component 112 of FIG. 1.

At block 750, repeat block 730 and block 740 with different values of the order parameter θ and time component N. These groups of values become the clusters that are analyzed to identify the motifs and stored in detected groupings data store 132 of FIG. 1.

Figure 8:
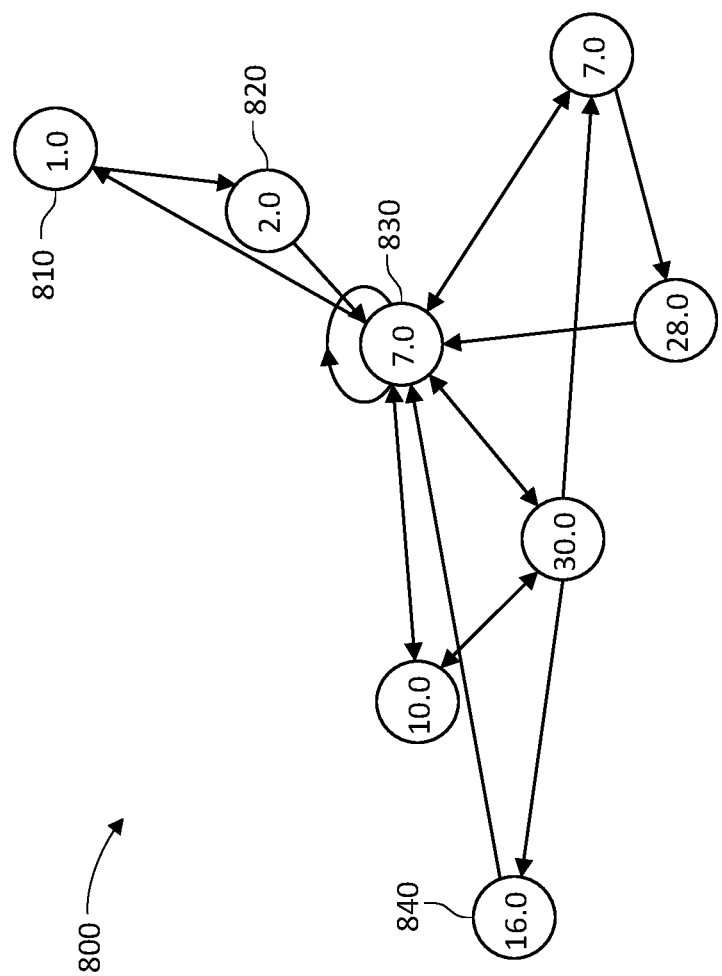
FIG. 8 provides an example of a directed graph generated from motifs, in accordance with some examples of the disclosure.

FIG. 8 provides an example of a directed graph generated from motifs, in accordance with some examples of the disclosure. An illustrative directed graph 800 is provided, which is a graph that is made up of a set of vertices connected by directed edges. The directed graph can illustrate the probability of traversing a particular sequence for a particular time interval. Using the generated motif sequence graph, which was generated from the plurality of motifs in the compressed dataset representation, the directed graph can illustrate the progression of sequences from the motif sequence graph.

Each of the points identified in the directed graph may correspond with the unique identifier of the compressed dataset representation of the motif. These points identified in the directed graph may include patterns corresponding with each unique identifier, for example, 1.0, 2.0, 17.0, 16.0, and so on. So, as illustrated in example 800, starting at point 810, a sequence of pattern "1.0" (from the compressed dataset representation) is identified in the time-series dataset. The directed graph illustrates the probability of identifying the next sequence in the time-series data, which is illustrated as point 820. At point 820, a sequence of pattern "2.0" is identified in the plurality of motifs. The next sequence is at point 830. At point 830, a sequence of pattern "17.0" is identified in the plurality of motifs. The next sequence is at point 840. At point 840, a sequence of pattern "16.0" is identified in the plurality of motifs, and so on.

In some examples, the sequence can have various starting points and may be based on the latest pattern identified by the system for a particular time sequence (e.g., datapoint extraction component 120 of computer system 100 in FIG. 1). For example, if the latest sequence identified corresponds with a sequence of pattern "17.0" at point 830, the next sequence likely to appear in the sequence is point 840 corresponding with the unique identifier "16.0." When the directed graph has been identified for the time-series dataset, the predicted sequence may be overlaid on the time-series dataset as a compressed dataset representation using the stored predictions.

In some examples, directed graph 800 is also weighted with corresponding weights assigned to each node in the directed graph. The greater the weight for the sequence, the greater the probability that the next sequence in the time-series data will be identified in a new time-series dataset.

Figure 9:
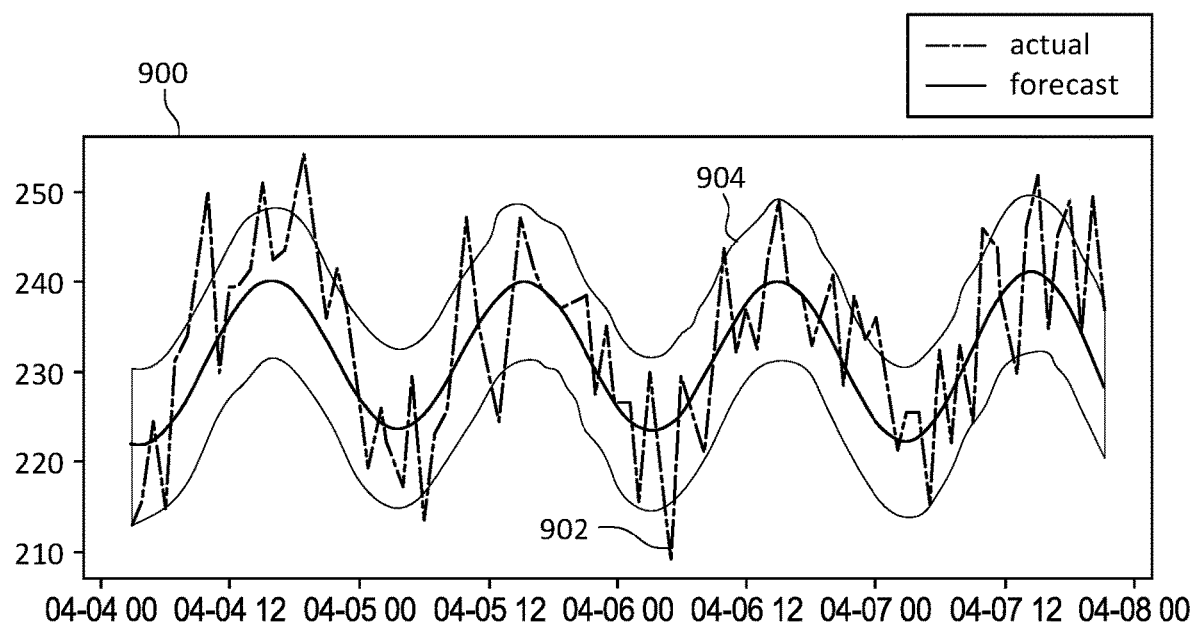
FIG. 9 is an example of a graph comparing actual time-series data with forecast data, in accordance with some examples of the disclosure.
Figure 9:
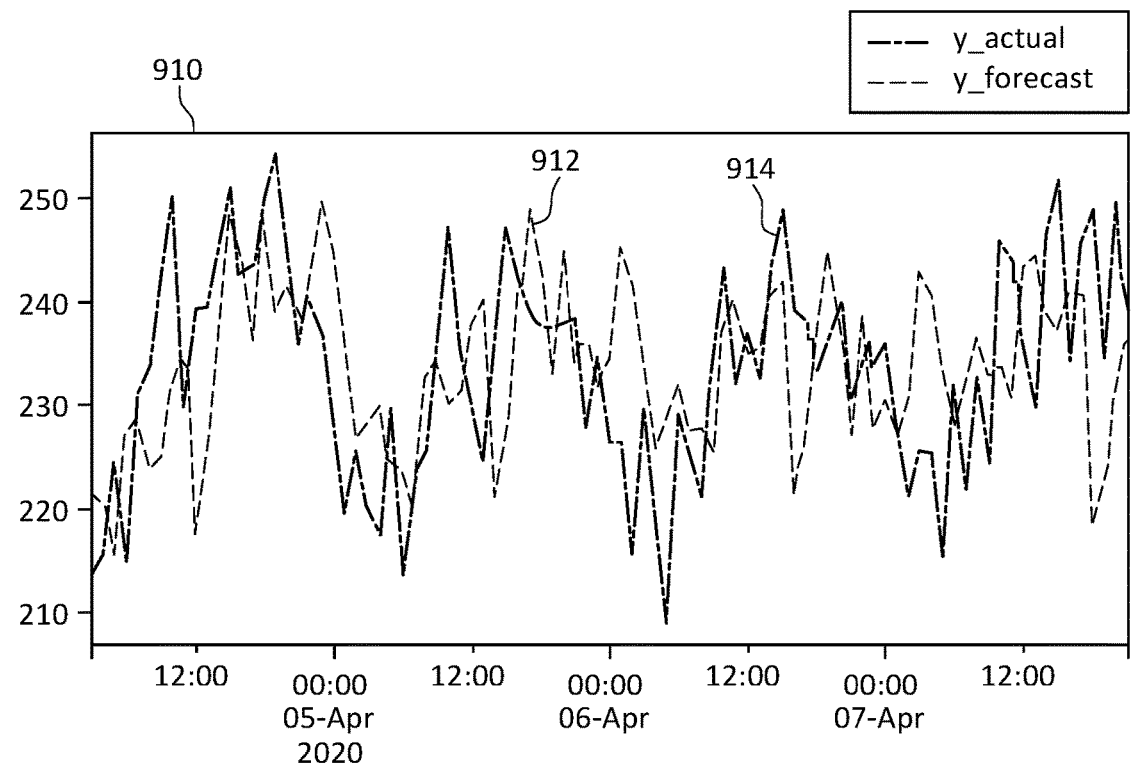

FIG. 9 is an example of a graph comparing actual time-series data with forecast data, in accordance with some examples of the disclosure. In example 900, an illustrative graph is provided that shows the aggregation of the prediction forecast for each time point in the time-series dataset using both values produced from the first machine learning model (e.g., the motif prediction forecast) and the second machine learning model (e.g., the seasonality prediction forecast). Dataset 902 corresponds with motif prediction forecast and dataset 904 corresponds with the seasonality prediction forecast. Each of datasets 902, 904 may be output from the trained machine learning models. In example 910, the prediction forecast for the new time-series dataset is provided with an overlay of the actual time-series dataset values. Dataset 912 corresponds with prediction forecast (after the summation process of the motif and seasonality prediction forecasts) and dataset 914 corresponds with the actual time-series dataset values.

Figure 10:
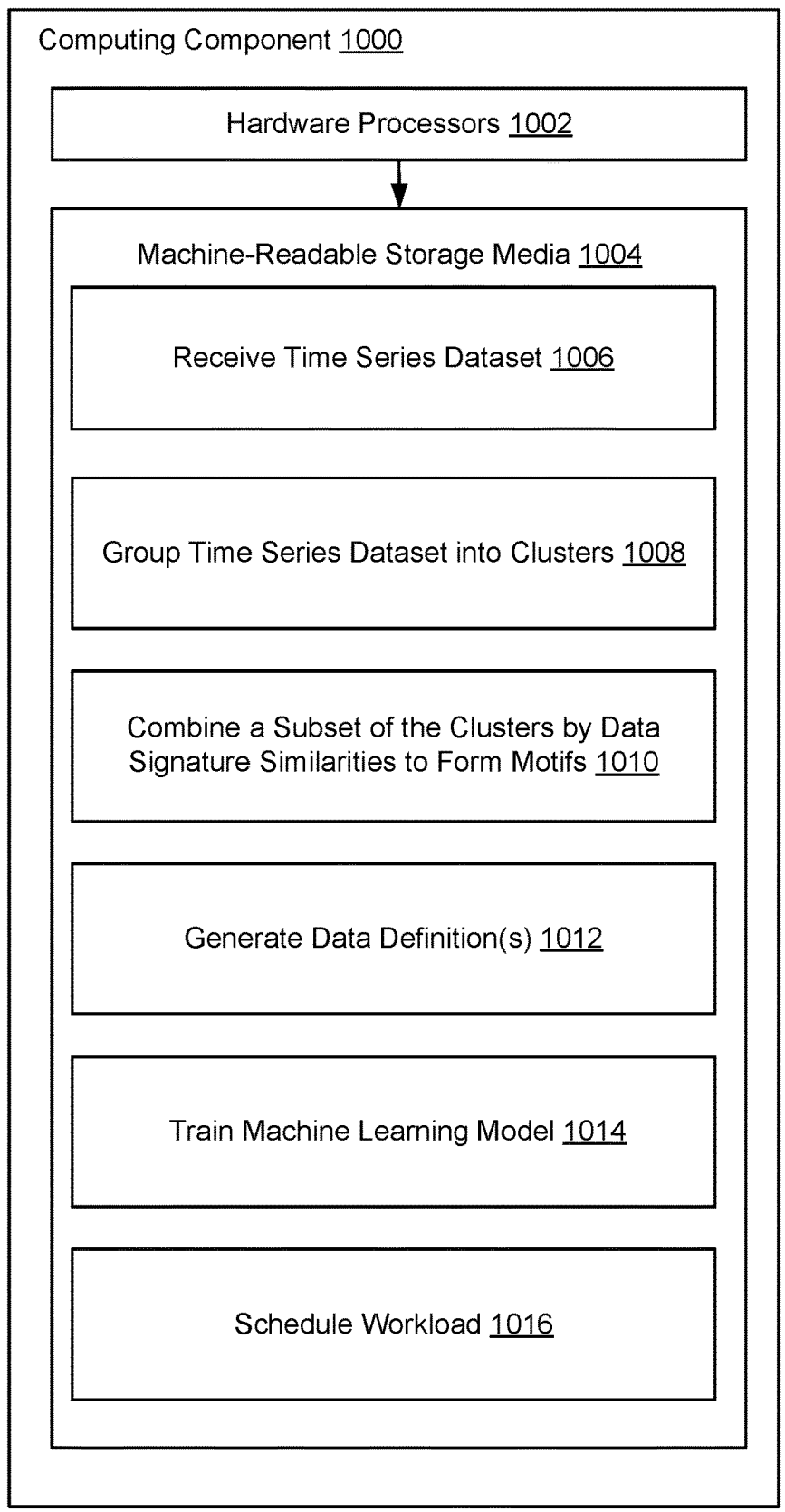
FIG. 10 is an example computing component that may be used to implement various features of embodiments described in the present disclosure.

FIG. 10 illustrates an example computing component that may be used to implement a compression of a time-series dataset using motifs, in accordance with various embodiments. Referring now to FIG. 10, computing component 1000 may be, for example, a server computer, a controller, or any other similar computing component capable of processing data. In the example implementation of FIG. 10, the computing component 1000 includes a hardware processor 1002, and machine-readable storage medium for 1004.

Hardware processor 1002 may be one or more central processing units (CPUs), semiconductor-based microprocessors, and/or other hardware devices suitable for retrieval and execution of instructions stored in machine-readable storage medium 1004. Hardware processor 1002 may fetch, decode, and execute instructions, such as instructions 1006-1016, to control processes or operations for implementing the dynamically modular and customizable computing systems. As an alternative or in addition to retrieving and executing instructions, hardware processor 1002 may include one or more electronic circuits that include electronic components for performing the functionality of one or more instructions, such as a field programmable gate array (FPGA), application specific integrated circuit (ASIC), or other electronic circuits.

A machine readable storage medium, such as machine readable storage medium 1004, may be any electronic, magnetic, optical, or other physical storage device that contains or stores executable instructions. Thus, machine readable storage medium 1004 may be, for example, Random Access Memory (RAM), non-volatile RAM (NVRAM), an Electrically Erasable Programmable Read-Only Memory (EEPROM), a storage device, an optical disc, and the like. In some embodiments, machine readable storage medium 1004 may be a non-transitory storage medium, where the term "non-transitory" does not encompass transitory propagating signals. As described in detail below, machine readable storage medium 1004 may be encoded with executable instructions, for example, instructions 1006-1016.

Hardware processor 1002 may execute instruction 1006 to receive a time-series dataset. The time-series dataset may be received from a sensor of a monitored device. For example, the time-series dataset may comprise various data signatures at different times. In some examples, the data received from monitored device is limited to what a third party responsible for monitored device is willing to provide and may be limited from a complete data history.

Hardware processor 1002 may execute instruction 1008 to group a contiguous set of datapoints of the time-series dataset into a cluster. The grouping may be implemented using an unsupervised machine learning model that is trained to group a continuous set of datapoints int a cluster. For example, the method may group the time-series dataset into a first cluster of a plurality of clusters.

Hardware processor 1002 may execute instruction 1010 to group the first cluster into a first motif. For example, the method may group the first cluster into the first motif due to the first cluster being similar to other clusters of the first motif. The similar may be determined using any of the methods described herein, including by identifying similarities in data signatures. In some examples, the method may determine each centroid of the dataset in determining the similarities in the data and grouping the cluster with the motif.

The centroids can be initialized using various methods, including a customized K-Means cluster algorithm. The customized K-Means cluster algorithm may consider the linear fashion that the time-series dataset was recorded in determining each cluster centroid. The method may initialize the centroids of each cluster with outlier points to determine local maxima and local minima points that correspond with actual values from the time-series dataset. With this, the time-series data may be segregated into smaller clusters areas, where each smaller cluster can include one significant minima or maxima point.

The method may also determine a distance between each of the data points and centroids, with respect to the time-series constraint (e.g., along a linear time-series), which can help improve standard distance functions that may wrongly cluster data points without respect to the linear inherency of time-series data. The distance formula may determine an amount of change in the time axis (e.g., x-axis) as weighed less compared to the same amount of change on the performance metric axis (e.g., y-axis) so that data points can be clustered following the time axis (e.g., using the formula described herein).

Hardware processor 1002 may execute instruction 1012 to generate a compressed dataset representation using a plurality of motifs. This dataset representation may include metadata of the plurality of motifs according to a pre-defined data schema. In some examples, the dataset representation may correspond to a compressed dataset that is stored in accordance with the data schema format (e.g., in a JSON format or in a time-series data store). Since the motifs can define patterns in the data (e.g., corresponding with data signatures of applications at the monitored device), the patterns, rather than the individual points of data, may be stored in the compressed dataset representation.

Hardware processor 1002 may execute instruction 1014 to train a machine learning model. For example, instruction 1014 may identify similarities across a plurality of clusters and combine a subset of the plurality of clusters based on data signature similarities to form a plurality of motifs using an unsupervised machine learning model. In another example, instruction 1014 may identify trend, seasonality, cyclic, and residual components as a second data definition to represent the detail of each of these effects on the time-series dataset. The data may be abstracted and stored in the format corresponding with the data schema.

An aggregate the prediction forecasts may be generated. The aggregation may include both values produced from the first machine learning model (e.g., the motif prediction forecast) and the second machine learning model (e.g., the seasonality prediction forecast). The aggregation of the prediction forecast values may be performed during a summation process that can generate the somewhat jaggedness produced in the original time-series data, and abstracted by the compressed dataset representation output by the first machine learning model, with an added seasonality generated by the second machine learning model.

Hardware processor 1002 may execute instruction 1016 to schedule a workload on a monitored device (e.g., monitored device 140 in FIG. 1) for a next or future time period. The prediction forecast can be used by a user or data administrator unit to schedule a new workload or to revise an existing workload.

Figure 11:
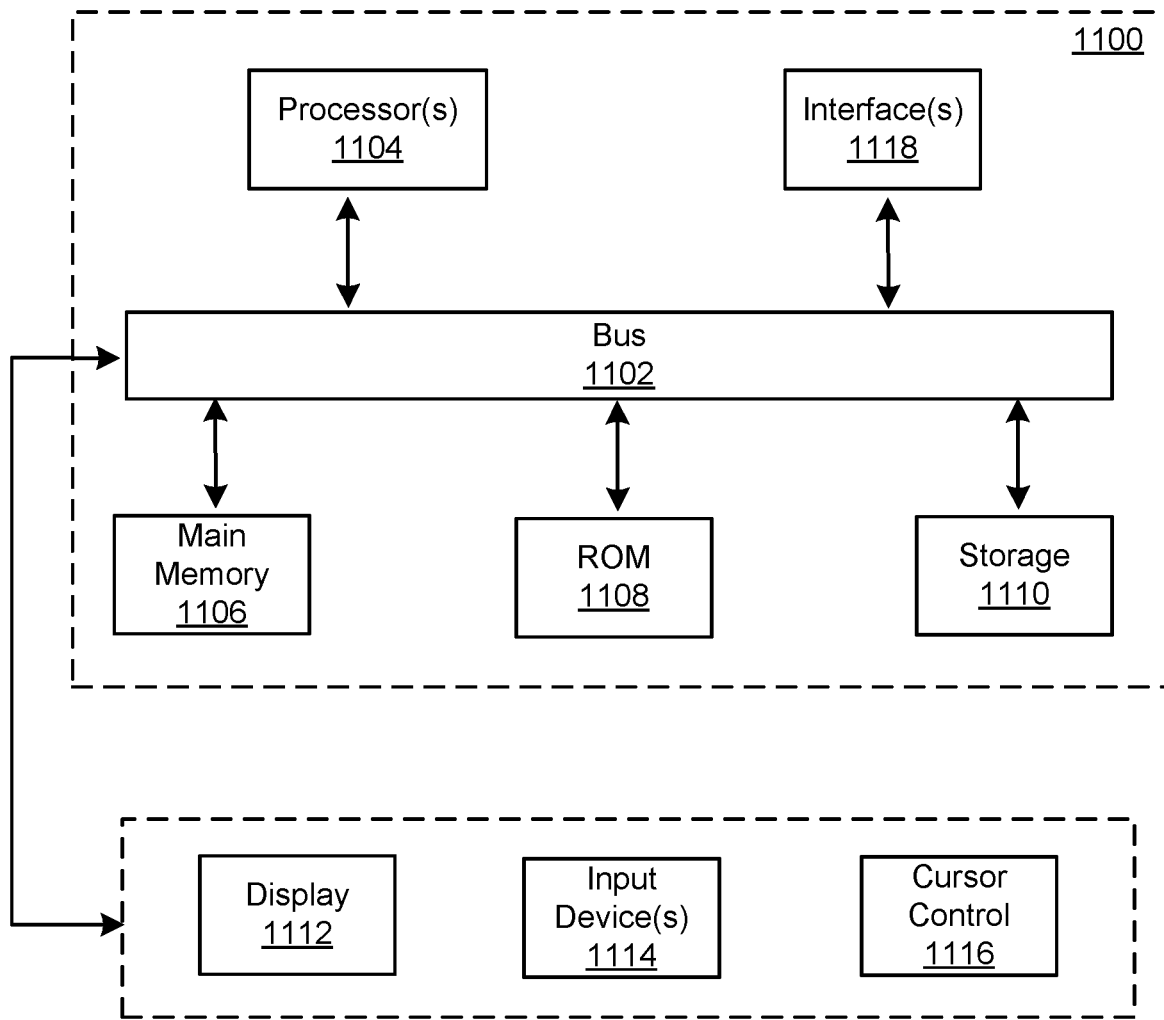
FIG. 11 depicts a block diagram of an example computer system in which various of the embodiments described herein may be implemented.

FIG. 11 depicts a block diagram of an example computer system 1100 in which various of the embodiments described herein may be implemented. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to a display 1112, such as a liquid crystal display (LCD) (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. In some embodiments, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable or machine readable storage medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1100 may implement the techniques described herein using customized hard-wired logic, one or more ASICs or FPGAS, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

The computer system 1100 also includes a communication interface 1118 coupled to bus 1102. Communication interface 1118 provides a two-way data communication coupling to one or more network links that are connected to one or more local networks. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN (or WAN component to communicated with a WAN). Wireless links may also be implemented. In any such implementation, communication interface 1118 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1118, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network and the communication interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1100.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

What is claimed is:

1. A system comprising:
   one or more processors; and
   a machine readable storage medium storing instructions that, when executed by the one or more processors, cause the system to:
      receive original time-series data from a sensor of a monitored device;
      group the original time-series data into a plurality of clusters;
      using an unsupervised machine learning model, combine a subset of the plurality of clusters based on data signature similarities to form a plurality of motifs;
      generate a first data definition using the plurality of motifs, wherein the data definition corresponds with a pre-defined data schema and values for each of the plurality of motifs, wherein the data definition creates a compressed dataset corresponding to the original time-series data;
      generate a second data definition using a seasonality prediction of the sensor of the monitored device;
      train a machine learning model to obtain forecasted power consumption data of the monitored device for a future time period with the first data definition and the second data definition, both received from the sensor of the monitored device; and
      using the forecasted power consumption data obtained by the trained machine learning model, schedule a workload to be executed at the monitored device during a portion of the future time period, wherein the forecasted power consumption data for the portion of the future time period is below a power consumption threshold.

2. The system of claim 1, wherein the first data definition corresponds with a directed graph of the plurality of motifs that comprise weighted edges between data points.

3. The system of claim 1, wherein the first data definition and the second data definition are stored as JavaScript Object Notation (JSON) files, and the system further to:
   recover memory space by deleting the original time-series dataset and storing the first data definition and the second data definition in place of the original time-series data.

4. The system of claim 1, wherein the monitored device is a processor in a server in an IT data center.

5. The system of claim 1, wherein the plurality of clusters comprise a local minima and maxima of subsets of the original time-series data.

6. The system of claim 5, wherein the system further to:
   using the local minima data point and the local maxima data point from each of the plurality of clusters of the original time-series data, determine a centroid of each of the plurality of clusters.

7. The system of claim 6, wherein the determination of the centroid of each of the plurality of clusters uses a customized K-Means cluster algorithm that considers a linear fashion of the original time-series data.

8. The system of claim 1, wherein the workload that is scheduled to be executed at the monitored device during the portion of the future time period is a reduced workload.

9. The system of claim 1, wherein the original time-series data comprises input power periodic data of the monitored device.

10. The system of claim 1, wherein the first data definition is generated using a first machine learning model, the second data definition is generated using a second machine learning model, and the first machine learning model and the second machine learning model are different than the trained machine learning model that obtains forecasted power consumption data.

11. The system of claim 10, wherein the second machine learning model is one of SARMA, FBProphet, Holt-Winter-ES, or Gated Recurrent Unit Network.

12. A computer-implemented method comprising:
    receiving, by a processor, an original time-series data from a sensor of a monitored device;
    grouping the original time-series data into a plurality of clusters;
    using an unsupervised machine learning model, combining a subset of the plurality of clusters based on data signature similarities to form a plurality of motifs;
    generating a first data definition using the plurality of motifs, wherein the data definition corresponds with a pre-defined data schema and values for each of the plurality of motifs, wherein the data definition creates a compressed dataset corresponding to the original time-series data;
    generating a second data definition using a seasonality prediction of the sensor of the monitored device;
    training a machine learning model to obtain forecasted power consumption data of the monitored device for a future time period with the first data definition and the second data definition, both received from the sensor of the monitored device; and
    using the forecasted power consumption data obtained by the trained machine learning model, scheduling a workload to be executed at the monitored device during a portion of the future time period, wherein the forecasted power consumption data for the portion of the future time period is below a power consumption threshold.

13. The computer-implemented method of claim 12, wherein the first data definition corresponds with a directed graph of the plurality of motifs that comprise weighted edges between data points.

14. The computer-implemented method of claim 12, wherein the first data definition and the second data definition are stored as JavaScript Object Notation (JSON) files, and the method further comprising:
   recovering memory space by deleting the original time-series dataset and storing the first data definition and the second data definition in place of the original time-series data.

15. The computer-implemented method of claim 12, wherein the monitored device is a processor in a server in an IT data center.

16. The computer-implemented method of claim 12, wherein the plurality of clusters comprise a local minima and maxima of subsets of the original time-series data.

17. The computer-implemented method of claim 16, wherein the method further comprising:
   using the local minima data point and the local maxima data point from each of the plurality of clusters of the original time-series data, determining a centroid of each of the plurality of clusters.

18. The computer-implemented method of claim 17, wherein the determination of the centroid of each of the plurality of clusters uses a customized K-Means cluster algorithm that considers a linear fashion of the original time-series data.

19. The computer-implemented method of claim 12, wherein the workload that is scheduled to be executed at the monitored device during the portion of the future time period is a reduced workload.

20. The computer-implemented method of claim 12, wherein the original time-series data comprises input power periodic data of the monitored device.

* * * * *